United States Patent [19]

Olson

[11] Patent Number: 4,471,718

[45] Date of Patent: Sep. 18, 1984

[54] APPARATUS FOR INCUBATING FISH EGGS

[76] Inventor: Donald E. Olson, R.R. 3, Box 18A, Frazee, Minn. 56544

[21] Appl. No.: 417,850

[22] Filed: Sep. 14, 1982

Related U.S. Application Data

[63] Continuation-in-part of Ser. No. 278,199, Jun. 29, 1981, abandoned.

[51] Int. Cl.³ .............................................. A01K 61/00
[52] U.S. Cl. ........................................................ 119/3
[58] Field of Search ................................ 119/2, 3, 4, 5

[56] References Cited

U.S. PATENT DOCUMENTS

| 136,834 | 3/1973 | Holtor | 119/3 |
|---|---|---|---|
| 3,076,432 | 2/1963 | Jung et al. | 119/3 |
| 3,517,648 | 6/1970 | Budge | 119/4 |
| 3,971,338 | 7/1976 | Alexson | 119/5 |
| 4,007,709 | 2/1977 | Wishner | 119/2 |
| 4,182,269 | 1/1980 | Young | 119/3 |
| 4,216,090 | 8/1980 | Dockery | 119/5 X |
| 4,300,477 | 11/1981 | Chapman | 119/2 |

OTHER PUBLICATIONS

"Plastic Hatching Jars", The Progressive Fish-Culturist, Oct. 1953, at p. 169.
"Salmon Stripper, Egg Counter, and Incubator", The Progressive Fish-Culturist, Oct. 1956, at p. 165.
"Jar Culture of Trout Eggs", The Progressive Fish-Culturist, Jan. 1959, p. 26.
"A Useful Container for Laboratory Work with Salmonid Eggs and Fry", The Progressive Fish-Culturist, Jan. 1960, at p. 10.
"Research Units for Egg Incubation and Fingerling Rearing in Fish Hatcheries & Laboratories", The Progressive Fish-Culturist, Apr. 1961, p. 83.
"A Simple Apparatus for the Incubation of Salmonid Embryos at Controlled Levels of Temperature, Water Flor and Dissolved Oxygen", The Progressive Fish-Culturist, Jul. 1977, p. 171.
"An Experimental Hatching and Rearing Facility for Larval Reservoir Fishes", The Progressive Fish-Culturist, Jul. 1967, at p. 177.
"Hydrodynamic Hatching Baskets", The Progressive Fish-Culturist, Apr. 1969, p. 114.
"Trout Egg Baskets38, Trout and Salmon Culture, California Fish Bulletin No. 164, Jan. 1980, at p. 65.
"Inexpensive Egg-Hatching Jar", The Progressvie Fish-Culturist, Apr. 1980, p. 112.
"Laboratory Incubation System for Salmonid Eggs", The Progressive Fish-Culturist, Jul. 1980, p. 190.

Primary Examiner—Hugh R. Chamblee
Attorney, Agent, or Firm—Merchant, Gould, Smith, Edell, Welter & Schmidt

[57] ABSTRACT

An apparatus (20) for incubating fish eggs is disclosed. The incubating apparatus (20) includes an insulated container (22) for holding a plurality of preferably square tubes (24). Apparatus (20) is portable and may be operated in a recirculation mode or by running external water through it continually. In the recirculation mode, water flows about a fluid circuit. An air pump (90) provides air to an air diffuser (104). The bubbles from diffuser (104) lift water in air lift tube (86) to tank (88). The water in tank (88) provides a pressure head to force the water throughout the rest of the circuit. Water from tank (88) is communicated through a filter (122) to a manifold chamber (34). The water is distributed from manifold chamber (34) to the plurality of tubes (24). As the water rises upward through tubes (24), it aerates and cleanses the incubating fish eggs. Since the upper portion (54) of tubes (24) is screened, the water has a common level throughout container (22). The water flows between tubes (24) out an exit pipe (50) and back to air lift tube (86). The present apparatus (20) provides a portable incubating device as a replacement for stationary fish hatcheries.

26 Claims, 12 Drawing Figures

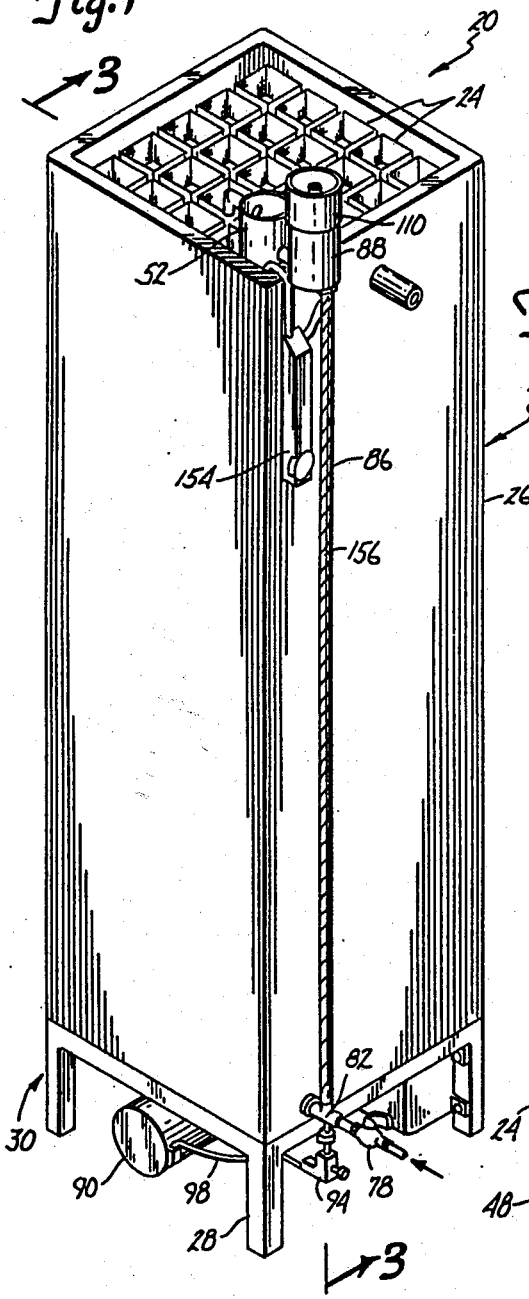
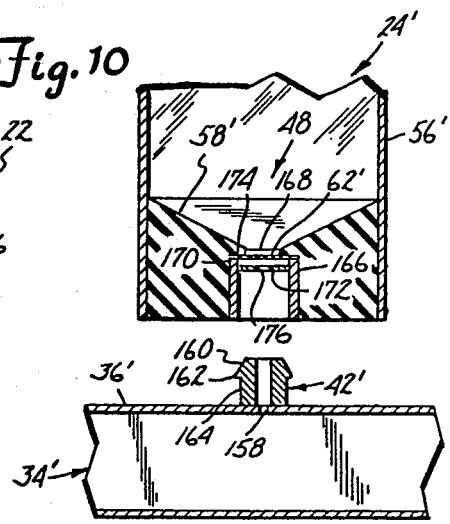
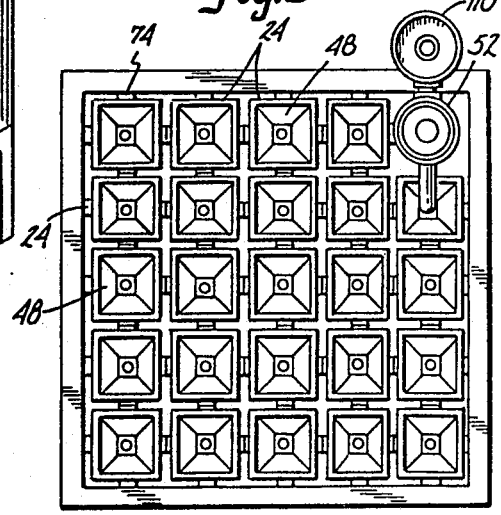

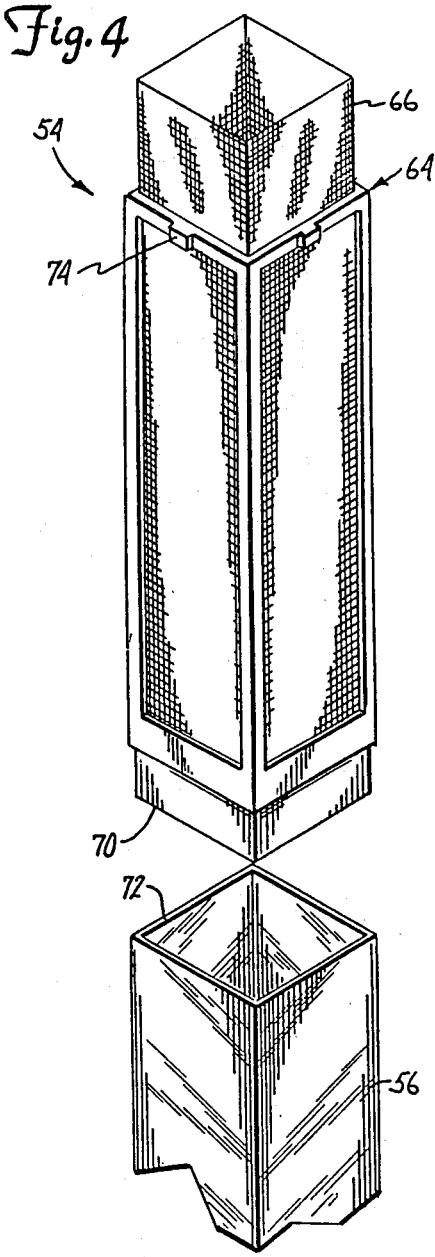
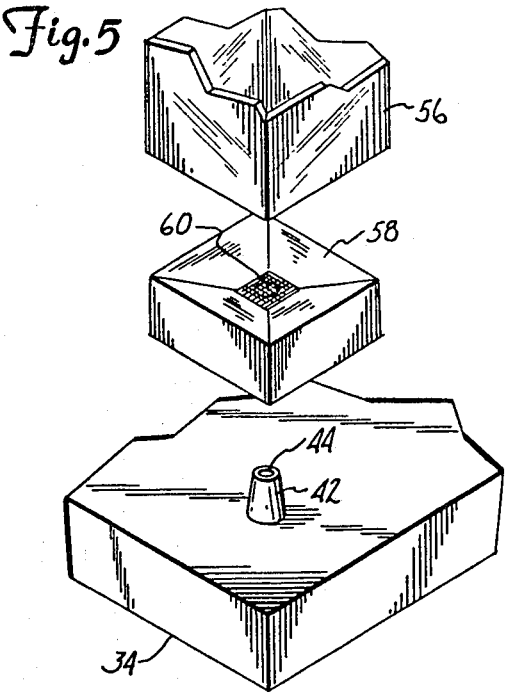
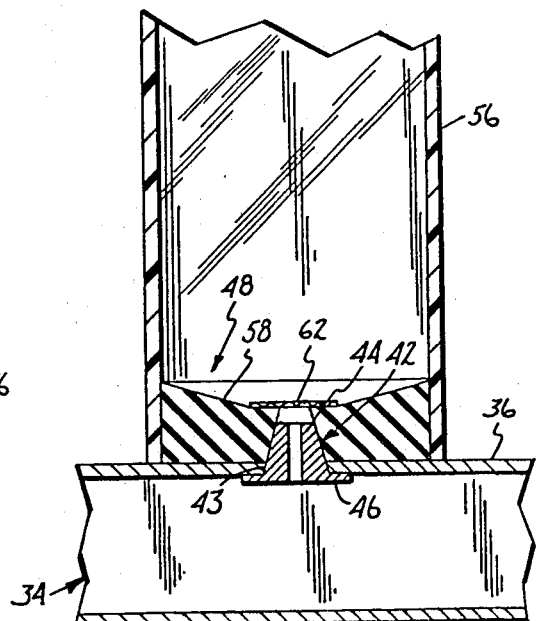

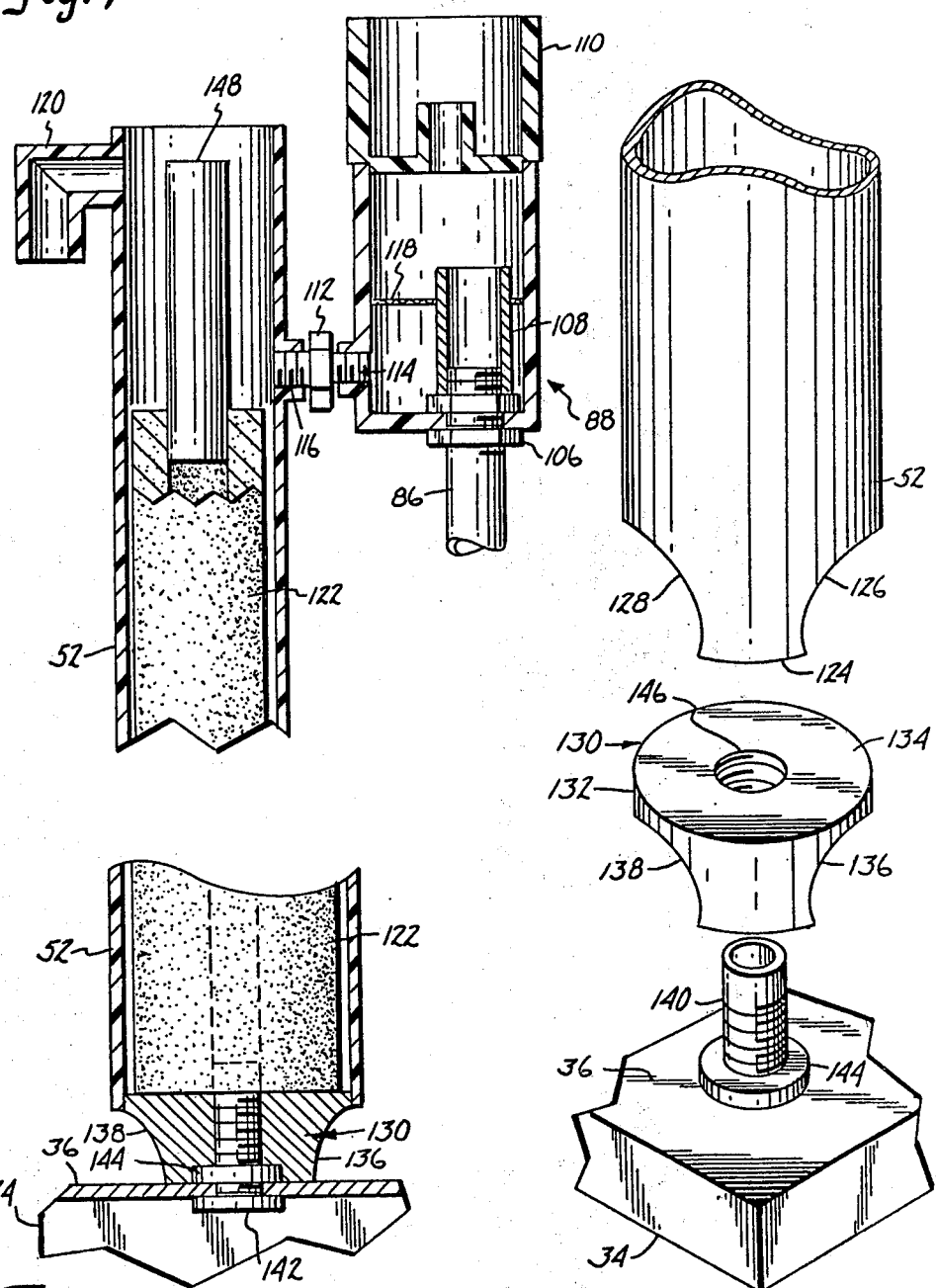

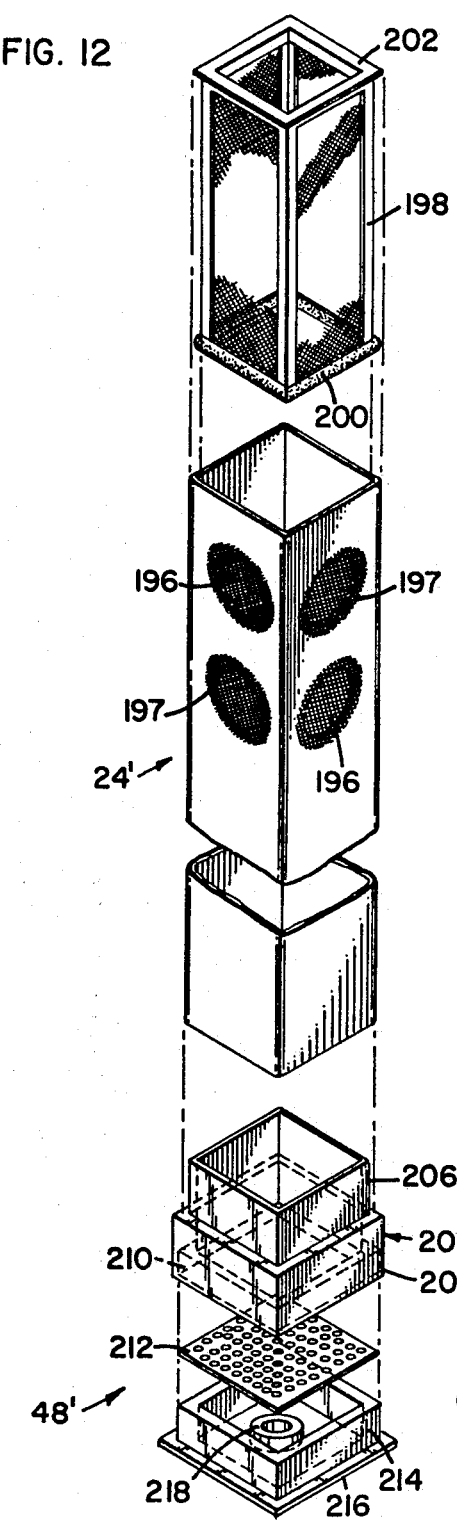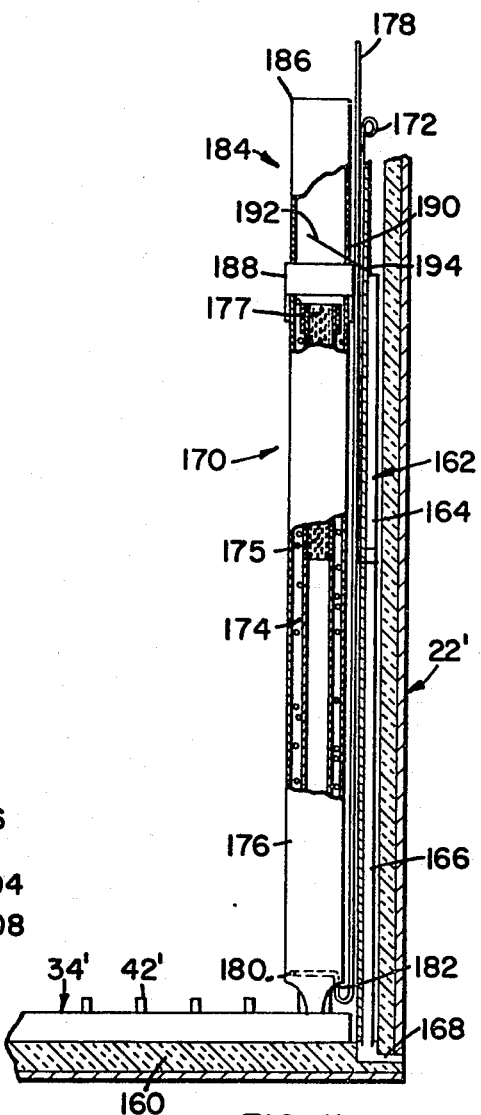

APPARATUS FOR INCUBATING FISH EGGS

This application is a continuation-in-part of the pending application filed June 29, 1981, under Ser. No. 278,199, now abandoned.

TECHNICAL FIELD

This invention relates to an apparatus for incubating fish eggs and, more particularly, to a compact, energy and cost efficient apparatus for incubating production quantities of a variety of kinds of fish eggs.

Presently, large items of equipment protected by appropriately sized buildings are used to hatch fish eggs.

The small fish or fry are then transported to a stocking location. The present apparatus replaces this type of capital investment with a portable apparatus operatable with batteries for aerating and recirculating water through the incubating fish eggs. The apparatus itself can be used to transport eggs or fry.

BACKGROUND OF THE INVENTION

Known production fish hatcheries represent a large capital investment. They have stationary locations and include costly high-volume pumps, large filtering systems, water heaters, large tanks and a variety of accessory equipment. All of these items are ordinarily housed in one or more buildings. In addition, known fish hatcheries use relatively large quantities of water. It is common for a hatchery to use 600 volumes of water per volume of eggs per day. For example, in a conventional walleye hatchery, it is not uncommon to circulate more than one million gallons of water through 500 quarts of eggs during a fifteen day incubation period. A similar volume of coregonid eggs incubated for a hundred and fifty days uses more than ten million gallons of water. Thus, even though hatcheries are often operated only a few weeks each year, the massive equipment must be permanently housed in special buildings, and the buildings must be restricted to sites having an adequate source of suitable surface or ground water.

Laboratory hatching systems are in stark contrast to the presently known production hatcheries. These systems tend to be small and are utilized to incubate only small quantities of eggs. An example of this type of system uses a twenty liter, insulated bucket to maintain subunit containers in a common, temperature-controlled water bath. Compressed air, distributed by an air stone, transports oxygenated water from a biological gravel filter up a narrow pipe. The overflowing water causes the water level to rise in a surrounding pressure tube. The resulting overpressure forces the oxygenated water to pass through connection tubes from the pressure tube to the walls of the subunit containers. Water from the subunit containers returns to the gravel filter for recirculation. The subunit containers are typically on the order of 7 centimeters in diameter and 1 centimeter high. During incubation, dead eggs are removed from the system using a pipette. Water is recirculated as described and exchanged approximately every thirty minutes. The system is sufficiently small that a number of samples using different water salinities or other varying parameters may be tested efficiently.

Prior to the present invention, it has not been possible to use laboratory type systems on a production scale. Thus, there has been a distinct need for an inexpensive, portable, production incubation system.

SUMMARY OF THE INVENTION

The present invention is directed to an apparatus for incubating fish egss. The apparatus includes a plurality of tubes having first and second ends. Each tube is for holding a quantity of fish eggs. The apparatus includes means for containing the first ends of the tubes in water. Water source means provides water conducive to an incubating environment. The water source means includes pressure means for causing the water to flow. The apparatus further includes manifold means for distributing the flowing water through the first ends of the tubes. In this manner, the water flows from the first end of the tubes toward the second end under the pressure of the pressure means thereby flowing through and cleansing and providing dissolved oxygen for the quantity of incubating fish eggs.

In a preferred embodiment, the apparatus for incubating fish eggs includes an insulated container having an approximately rectangular cross-section. The incubation container is ordinarily elevated on legs sufficiently long to locate an air pump beneath it. The air pump may be energized with either alternating or direct current sources. A plurality of tubes are located within the incubation container. The tubes are preferably square for greater egg capacity and a reduced ratio of water to eggs in the system. Each tube has a plug at its bottom with a centered opening. A screen covers the opening near the upper surface. Incubating fish eggs within each tube rest on the plug and are prevented from falling through the opening by the screen. The upper end of the tube has a frame-like retaining structure with a perimeter similar to that of the tube. A screen is attached to all sides of the structure to form an upper screened portion with a shape similar to the tube.

The preferred apparatus includes a fluid circuit for recirculating water. A water source fills the container to the required water level and partially replaces recirculated water throughout incubation. A drainage valve is located near the bottom of the incubation container.

A vertically-oriented air lift tube external to the incubation container rises from a tube connected between the incubation container and the water source. An air line from the air pump is installed in such a manner as to exhaust air through a diffuser near the lower end of the air lift tube. Since the air lift tube is in fluid communication with the water inside the incubation container, the air lift tube is ordinarily filled with water. The bubbling air from the air diffuser lifts water in the air lift tube into a tank above the tube. The lifted water provides a pressure head for forcing water throughout the fluid circuit.

Proximate the air lift tube and tank thereabove is a filter element or cartridge. The upper end of the filter element has a handle so the filter may be easily removed and replaced within its housing. The lower end of the filter element is open and fits about a short tube extending above a manifold chamber. Water from the pressure head tank is communicated to the filter element. The water passes through the filter element wall and is then forced into the manifold chamber at the lower end of the incubation container.

The manifold chamber is comprised of an enclosed housing having a perimeter similarly shaped but somewhat smaller than the interior perimeter of the incubation container. The upper wall of the manifold chamber has a plurality of nipple elements regularly spaced thereon. The openings in the plugs in the lower ends of the incubation tubes mate with the nipple elements of the manifold chamber. Thus, the incubation tubes are held in place by the nipple elements. As water is forced from the manifold chamber through the nipple elements into the incubation tubes, the incubating fish eggs are cleansed and provided with oxygen in the flowing water. The water flows from the lower end of the tubes to the upper end to form a water level common with all the tubes at a height above the bottom of the vertical screens. In the recirculating mode, water then is drawn downwardly between the incubating tubes and out an exhaust pipe through a valve to a tee connecting with the air lift tube and water inlet valve.

Although it must be emphasized that container and tube dimensions may vary, approximately two quarts of eggs can be incubated and hatched in a tube which is two and one half inches square and 39 inches in length. That is, approximately 5.75 million walleye eggs may be incubated and hatched in an incubating apparatus having 24 incubation tubes and one filter housing tube.

When the incubating apparatus is operated without recirculating water, then external water flows continuously from the water source. The water flows up the air lift tube, being pushed by the pressure from the water source, through the filter element and manifold chamber to cleanse the eggs. The water then exhausts from the screened portion at the upper ends of the incubating tubes through an outlet overflow tube in the upper wall of the incubating container. When the incubating apparatus is operated in the more usual water recirculation mode, then the air or oxygenating source is required to provide both new oxygen to the water and flow energy by lifting water into the pressure head tank.

Incubating fish eggs require adequate oxygen, appropriate water temperature and removal of metabolic waste materials, primarily ammonia and carbon dioxide. Preferably, air is bubbled into the air lift tube at a rate to oxygenate the water to near saturation and to drive off carbon dioxide. Heating apparatus with appropriate controls keeps water temperature in an optimal range, generally 40° F. to 60° F. depending on fish species. The rate of flow of water from the water source into the system must sufficiently remove metabolic wastes and also prevent water temperature from rising to an unacceptable level due to heat gain from ambient room temperature. Ordinarily, flow rate can be lesser during early incubation and must be increased in the later stages and at hatching.

Thus, the present incubator apparatus is particularly advantageous since the initial cost of primary and accessory equipment is much less than that needed for a contemporary stationary hatchery. The compact size considerably reduces capital investment and the reduced water requirement increases incubating versatility. Special buildings for housing equipment are unnecessary or, at least, much reduced in size and expense. The incubator apparatus is portable and not restricted to sites having a large supply of surface or ground water.

The incubator apparatus has the further advantage that it may be used at different locations during different seasons for eggs of different fish species. The apparatus is easily moved depending on the operational needs.

The present invention is the only known production incubator for fish eggs that uses an air lift pump to create a low pressure head to force water circulation throughout the system. This is particularly advantageous since detrimental gases are removed from the water during the bubbling agitation in the air lift pump before the water is circulated to the egg masses.

The apparatus is inventively simple and convenient. Basically, incubation tubes are placed in a water bath. A simple friction fit exists between a plug at the bottom of a tube and the water distribution manifold. Each incubation tube may be advantageously lifted from or placed into the recirculating watch system.

Additionally, the apparatus allows more precise control of incubation temperatures thereby producing healthier fry, that is, newly hatched fish, and more versatile scheduling of hatching and fry stocking operations. The present incubator apparatus does not require a separate fry collection tank. Hatched fry are retained in each egg container tube thus allowing more accurate allotment of fry stocking quotas. Less time and effort of hatchery personnel is required, and the fry are subjected to reduced handling stress.

With the present incubation apparatus, application of fungicides for prophylactic treatment and introduction of other reagents is more simply administered. In addition, the materials required are greatly reduced.

Since many other advantages and objects obtained by the use of this important invention exist, reference should now be had to the drawings which form a further part hereof and to the accompanying descriptive matter in which there is illustrated and described in greater detail a preferred embodiment of the invention.

BRIEF DESCRIPTION OF THE DRAWINGS

FIG. 1 is a perspective view of an apparatus in accordance with the present invention;

FIG. 2 is a top view of the apparatus shown in FIG. 1;

FIG. 4 is a partially exploded view of the upper screened portion of an incubation tube;

FIG. 5 is an exploded view of the lower portion of an incubation tube as it mates with the manifold chamber;

FIG. 6 is a cross-sectional view of an incubation tube properly located with respect to the manifold chamber;

FIG. 7 is a cross-sectional view of the pressure head tank and the filter housing assemblies;

FIG. 8 is an exploded view of the lower portion of the filter housing as it mates with the manifold chamber;

FIG. 9 is a cross-sectional view of the filter housing as it mates with the manifold chamber;

FIG. 10 is an exploded, cross-sectional view of an alternate embodiment of a plug and nipple configuration;

FIG. 11 is a cross-sectional view of an alternate embodiment showing air lift and drainage features; and FIG. 12 is an exploded view of an incubation tube.

DETAILED DESCRIPTION OF THE INVENTION

Figure 3:
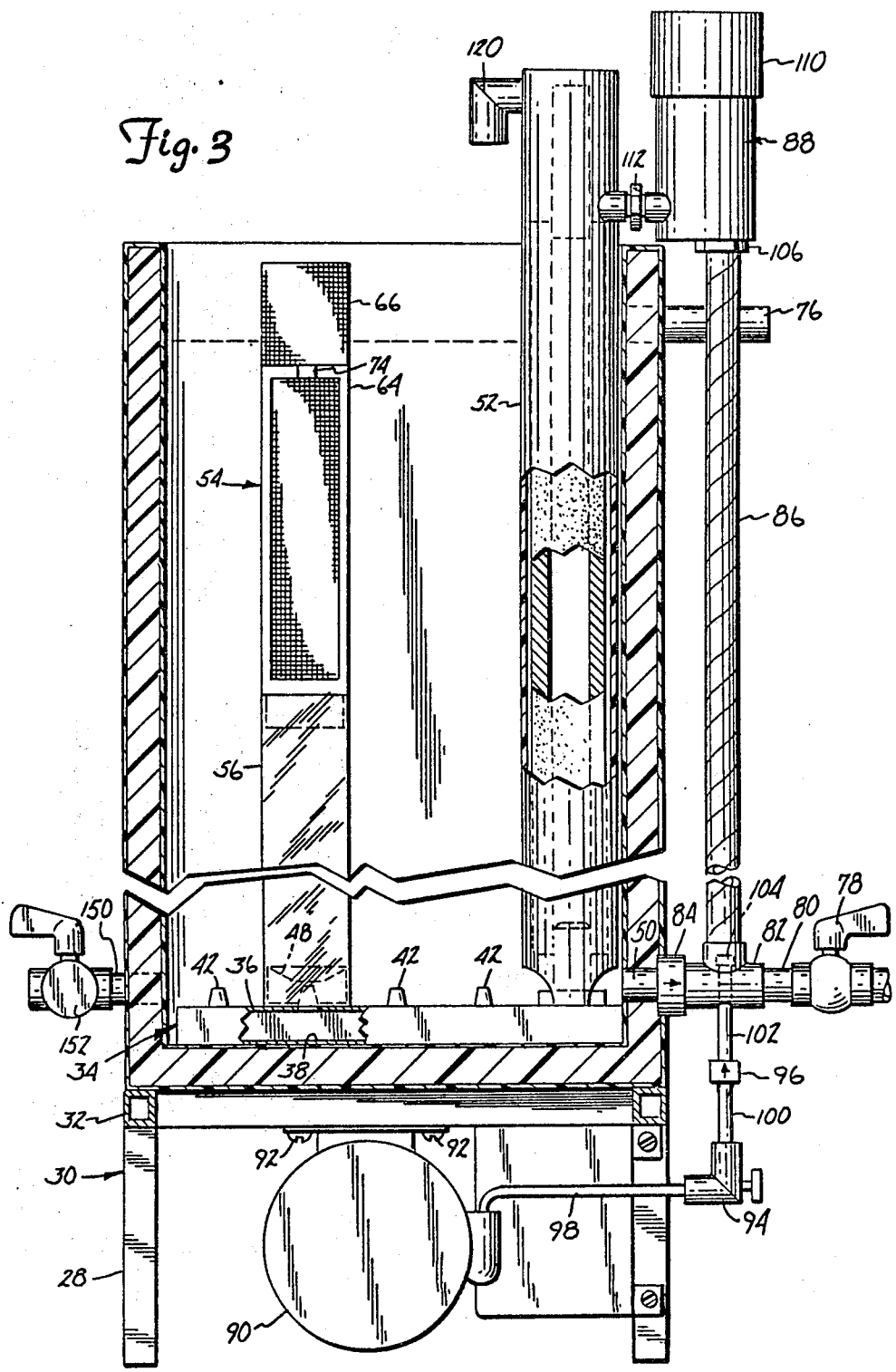
FIG. 3 is a cross-sectional view, taken along line 3—3 of FIG. 1.

Referring now to the drawings, wherein like reference numerals designate identical or corresponding parts throughout the several views, and, more particularly, to FIG. 1, an apparatus for incubating fish eggs in accordance with the present invention is deisgnated generally as 20. Apparatus 20 is comprised of a container 22 which holds a plurality of tubes 24. A number of other elements are interconnected with tubes 24 to form a fluid circuit for running external water therethrough or for recirculating continually oxygenated water therein.

In a preferred embodiment, incubating container 22 is essentially an open-ended, insulated box 26 on legs 28. Box 26 may be square or it may have other dimensions, for example, rectangular cross-sectional dimensions. The lower end of the box is insulated, as shown in FIG. 3, while the upper end is open. The height of box 26 is determined by the length of tubes 24 and the optimal water level to be maintained within container 22 during the incubation process. Box 26 is insulated in order to maintain the water temperature therein at a relatively uniform and constant level. In warm environments, the insulation aids in keeping the water cool thereby reducing a need for cooling make-up water.

Box 26 may be made from any of a number of materials as long as it is water-tight. Legs 28 may be an integral part of the structure of box 26, or they may be a part of a separate framework 30 on which box 26 is supported. As shown in FIG. 3, framework 30 includes a weldment 32 of four box-section members to form a square. Four legs 28 are welded to extend downwardly from the weldment 32. Various types of commonly known retaining apparatus, not shown, may be used to hold box 26 to framework 30.

A manifold chamber 34 having a similar but slightly smaller shape than the internal shape of incubating container 22 rests on the bottom surface of incubating container 22. The water distribution function of the manifold chamber 34 as a part of a fluid circuit is discussed hereinafter. As shown in the embodiment of FIGS. 3 and 6, manifold chamber 34 is comprised of spaced-apart top and bottom plates 36 and 38, respectively. Side plates 40 extend between the two plates 36 and 38 at the edges thereof to form a water-tight enclosure. A plurality of nipple elements 42 project through openings 43 in top plate 36 (see FIG. 6). Nipple elements 42 have a frusto-conical shape with an axial cylindrical opening 44. Nipple elements 42 have a flange 46 extending around the base portion of the elements 42. Nipple elements 42 are fastened with an adhesive, screw, or other mechanism such that flange 46 is retained along the underside of top plate 36. Nipple elements 42 extend above the upper surface of top plate 36 sufficiently to retain plug 48 which is fastened at the bottom end of a tube 24 as described hereinafter. Nipple elements 42 do not extend through plug 48 but rather remain a short distance below the upper surface of plug 48. Note that, as indicated by the alternate embodiment described hereinafter, elements 42 are not limited to the presently described shape.

The dimensions of tubes 24 correspond sufficiently with the inside dimensions of container 22 such that a desired number of tubes 24 may compactly fit within container 22 and fill the entire space in an appropriate manner. Tubes 24 are uniformly spaced from each other and from the inside wall surfaces of container 22 as shown in FIG. 2. The space between adjacent tubes 24 and the walls of container 22 is sufficient to allow the tubes to be lifted vertically from the container. All tubes 24 are substantially the same except that one space where a tube 24 might otherwise be located is filled by filter housing 52 described hereinafter. In alternate embodiments, in particular an embodiment described hereinafter, one or more tubes 24 may be replaced with an assembly taking the place of air lift tube 86. In such embodiments, exhaust pipe 50 through the wall of container 22 may be eliminated.

A tube 24 is comprised of upper and lower portions 54 and 56, respectively. Lower portion 56 is preferably a standard square tube. As shown in FIGS. 5 and 6, plug 48 matches approximately the internal dimensions of lower portion 56 of tube 24. The upper surface 58 of plug 48 has a concave pyramid shape with a flat portion near the peak. A frusto-conical opening 60 is centered in plug 48 and matches the shape of the upper portion of nipple elements 42. A screen 62, for preventing fish eggs from dropping through openings 60 and 44 into manifold chamber 34, covers the upper end of opening 60 and is fastened to plug 48. Plug 48 is of molded rubber or silicone material. It forms a friction fit into or is otherwise fastened to the lower portion 56 of tube 24. Plug 48 is removable to facilitate washing of lower portion 56 and to allow plugs of various designs to be exchanged to provide suitable water flow for eggs of various fish species. Since opening 60 mates with nipple element 42, tube 24 is located and retained at its lower end by allowing nipple element 42 to project into opening 60. The concave design shape of the upper surface 58 of plug 48 helps to move the water so as to provide oxygen and cleanse the fish eggs of a particular species as the water flows upwardly from the lower end of tube 24 toward the upper end.

As shown in the embodiment of FIGS. 3 and 4, the upper portion 54 of a tube 24 is comprised of a retaining structure 64 covered with a screen 66. Retaining structure 64 has the same outer envelope as the lower portion 56 of tube 24. However, large open windows 68 are cut in each side of what would otherwise be a square tube. Approximately half the thickness of each side of the lower end 70 of upper portion 54 is machined away. In a similar fashion, the inner sides of the upper end of the lower portion 56 of tube 24 is machined. In this way, upper portion 54 may be inserted into lower portion 56 to mate tightly together. Screen 66 is fastened to the inside of retaining structure 64 so as to cover windows 68 and to extend a short distance above retaining structure 64.

Toward the end of an incubation period when eggs hatch, the egg shells tend to rise and become caught in screens 66, while the fry tend to remain midway in tubes 24. Upper portions 54 of tubes 24 are easily removed and cleaned of egg shells if necessary. Additionally, upper portion 54 is removed from lower portion 56 when pouring fry from a tube 24.

The incubating apparatus 20 in accordance with this invention includes a fluid circuit which not only may accept external water for flowing through and cleansing the fish eggs in tubes 24 and exhausting out overflow tube 76, but also provides an optional continuous fluid pathway for complete recirculation of a given amount of water within apparatus 20. An air source is available for providing air to oxygenate external water or recirculated water as required and also to provide flow energy to recirculated water.

A water source, not shown, communicates water to inlet valve 78 as seen most clearly in FIG. 3. Alternatively, of course, water may be introduced through the top of container 22. When the valve 78 is open, water flows through connecting tube 80 to tee 82. The side of tee 82 opposite connecting tube 80 is connected through a check valve 84 to exhaust pipe 50 in the wall of incubating container 22. Check valve 84 is oriented to allow water to exhaust from incubating container 22 while preventing water from entering. Air lift tube 86 is connected to the upright portion of tee 82. The upper end of air lift tube 86 connects to water pressure tank 88.

Air from the air system is inserted through the bottom of tee 82 into air lift tube 86. The air system includes an air pump 90 attached, for example, with nut and bolt combinations 92 to support framework 30 of incubating container 22. Air pump 90 is connected to tee 82 through regulator valve 94 and check valve 96 by tubes 98, 100 and 102. Tube 102 extends through the bottom of tee 82 and is sealed thereto to prevent water leakage. The upper end of tube 102 extends into air lift tube 86 or, at least, into the upper portion of tee 82. An air stone or air diffuser 104 is fastened to the upper end of tube 102. Thus, as air is expelled from tube 102, it is diffused into small bubbles which rise in air lift tube 86 to lift water upwardly into tank 88. The flow of air must be sufficient to supply adequate oxygen for embryo development. In addition, the flow of air and the inside diameter of air lift tube 86 must be sufficient to provide a lifting of sufficient water to establish the required pressure head tank 88.

Tank 88 is located approximately vertically above air lift tube 86. The bottom of tank 88 is approximately at the same vertical level as the top of incubating container 22. In this way, a pressure head of a few inches may be created. As shown in FIG. 7, air lift tube 86 is fastened by a double nut union 106 to the bottom of tank 88. A short extension tube 108 extends air lift tube 86 a short distance inside tank 88. Tank 88 is open to the atmosphere at its upper end. A foam fractionator cup 110 is installed at the upper end of tank 88. Foam fractionators are commonly known and are ordinarily comprised of a cup having an opening in the bottom with upwardly extending flanges around the opening. A foam fractionator functions by allowing foam to pass upwardly through the opening and expand toward the walls of the cup. The upwardly extending flange prevents the foam from receding through the opening. Hence the foam is captured and removed from the fluid circuit. Organic wastes are removed in the foam.

The lower portion of tank 88 is in fluid communication with the upper end of filter housing 52. A double-threaded union 112 may be used to thread into threaded openings 114 and 116 in tank 88 and filter housing 52, respectively. The upper end of extension tube 108 is above opening 114. A screen 118 is retained at a level between the upper end of extension tube 108 and opening 114. Screen 118 functions to prevent large particulate matter from entering filter housing 52.

As shown in FIGS. 1 and 2, filter housing 52 is preferably a round tube. Filter housing 52 extends above incubating container 22. An overflow tube 120 protrudes from the upper wall of filter housing 52 at a level above opening 116. Overflow tube 120 is oriented to direct water back into the upper portion of incubating container 22. Overflow tube 120 functions only if water cannot pass through filter 122 sufficiently fast so that water rises in filter housing 52 to the level of overflow tube 120.

As shown in detail in FIG. 8, the lower end 124 of filter housing 52 has scalloped portions 126 and 128. Scalloped portions 126 and 128 are simply arcuate cutaways from end 124 of filter housing 52 which allows passage of water to exhaust pipe 50. A filter housing plug 130 is comprised of a short tube having an outer diameter slightly smaller than the inner diameter of filter housing 52. Plug 130 has an upper cover 134 with a centered opening. Plug 130 also has scalloped portions 136 and 138 which match the scalloped portions 126 and 128 of filter housing 52. Plug 130 is sufficiently long to extend from the lower end 124 of filter housing 52 to above the scalloped portions 126 and 128. Plug 130 is fastened by adhesive, screws or other fastening mechanism to filter housing 52.

Filter housing 52 rests on manifold chamber 34. As shown in FIGS. 8 and 9, a relatively small diameter tube 140 passes through an opening in the top 36 of manifold chamber 34. Tube 140 is held in place by an appropriate fastening mechanism such as a pair of nuts 144, 142, one on either side of top 36. Cover 134 of plug 130 has an opening 146 centered therein. Opening 146 is slightly larger than the diameter of tube 140. Hence, the lower portion of filter housing 52 is held in place by tube 140 passing through opening 146 of plug 130 which is fastened to the lower portion of filter housing 52.

In addition to the above description, it is to be understood that filter 122 may have various formed shapes or be an accumulation of a material. Also it may be comprised of a variety of different materials. In situations where a water source is limited (for example, in transit), filter 122 may be comprised of natural zeolite minerals. Natural zeolite minerals are comprised essentially of alumino silicate, crystalized into molecular sized cavities connected by a series of channels. Natural zeolites have the ability to ion-exchange with certain ions. The preferable natural zeolite mineral clinoptilolite has the ability to absorb unionized ammonia, $NH_3$, and ion exchange ammonia ion $NH_4$. Thus, ammonia levels would be reduced to a level non-toxic to fish. Hence, in this case, in combination with the water oxygenation function of the air system, the filter 122 would renew the water and continually keep it conductive to egg incubation. Once the clinoptilolite has been substantially loaded with ammonia, the filter cartridge may be removed and replaced by a regenerated cartridge. Clinoptilolite is regenerated in a saline solution.

The filter 122 is preferably cylindrical in shape. The outer diameter should be sufficiently small to fit within filter housing 52 and allow space between the inside wall of housing 52 and the outer surface of filter 122 for the accumulation of water. The inner diameter should be slightly larger than tube 140 so that tube 140 may be received within the open lower end of filter 122. At the same time, the fit of filter 122 about tube 140 should be reasonably tight to prevent any significant amount of water from by-passing the filter before passing through tube 140 into manifold chamber 34. The upper end of filter 122 is threaded or otherwise has a handle 148 fastened to cover the cylindrical opening. Handle 148 allows easy removal and replacement of filter 122. The upper end of filter 122 is located a short distance below opening 116. As water enters filter housing 52 from tank 88, it flows downwardly around the sides of filter 122. The water is forced or otherwise drawn through filter 122 and continues to flow downwardly through tube 140 into manifold chamber 34. From manifold chamber 34 the water is forced upwardly through nipples 42 into tubes 24 as described hereinbefore.

Alternatively, filter 122 may be shaped to accept incoming water between the walls defined by the inner diameter. With the bottom end of filters 122 covered, the water would pass through filter 122 to the space between filter 122 and filter housing 52 before entering tube 140. In this case, of course, tube 140 would not be received in the lower end of filter 122. With such a shape, since the particulate matter would be retained within filter 122, particulate matter would be removed when filter 122 is removed.

Exhaust pipe 50 is a part of the fluid circuit and, during recirculation, is the usual mechanism by which water leaves incubating container 22. There are, however, other ways for water to exhaust from incubating container 22. Container 22 is drained through tube 150 and valve 152 located in the wall of incubating container 22 approximately at the same level as the top of manifold chamber 34.

Overflow water exits through tube 76. Discharge tube 76 is located in the wall of incubating container 22 near its upper edge. When the incubator is operated with input valve 78 closed there is no discharge through tube 76. With input valve open or partially open, water is discharged through tube 76 in volume equal to inflow volume.

The water temperature in incubating container 22 may be monitored and controlled by a commonly known thermostatic control 154 (see FIG. 1). Thermostatic control 154 is electrically connected with heat tape 156 which is wrapped about air lift tube 86. The heat tape is powered by either an alternating or direct current source (not shown). The thermostatic control 154 keeps the water in individual containers 22 at a relatively uniform and optimal incubating temperature. When a number of independent recirculating incubators 20 are operated simultaneously, separate temperature controls 154 provide versatility so as to control the rate of egg development and hatching in the various lots of eggs. As indicated hereinbefore, make up water commonly provides cooling. A heating system provides the versatility of heating if necessary or desired.

In operation, a filter element 122 is installed in filter housing 52. Tubes 24 are installed within incubating container 22 by placing the frusto-conical openings in plugs 48 over nipples 42.

Air regulator 94 is appropriately adjusted. Air pump 90 is started so that air is being diffused in air lift tube 86. With drain valve 152 closed, input valve 78 is opened. Water begins filling incubating apparatus 20. The water flows through input valve 78 and tube 80 to tee 82. Check valve 84 does not allow the water to pass immediately into incubating container 22. Rather, the water flows upwardly through air lift tube 86 into tank 88. From tank 88, the water flows through union 112 into filter housing 52. The water passes through filter 122 downwardly through tube 140 into manifold chamber 34. From manifold chamber 34, the water passes through the plurality of nipples 42 through screens 62 into tubes 24. When water flows out tube 76, input valve 78 is adjusted to supply sufficient water to maintain the desired temperature and to control the accumulation of metabolic wastes during egg incubation.

Fish eggs to be incubated are poured into tubes 24 while the incubator is operating in a recirculating mode. The water level in each tube 24 is common throughout incubating container 22 since water can freely pass through screens 66. The water flows downwardly between tubes 24 toward filter housing tube 52. The water is drawn by the decrease in pressure near exhaust pipe 50 resulting from water being lifted in air lift tube 86 due to the bubbling air. The water flows through scalloped portions 126 and 128 of filter housing 52 and scalloped portions 136 and 138 of plug 130. The water continues to flow through exhaust pipe 50 and chech valve 84 into tee 82. The air bubbling through diffuser or air stone 104 lifts the water in air lift tube 86 into tank 88 where the water is at a higher level than the level in incubating container 22. Hence, the water in tank 88 has a pressure head relative to the water in incubating container 22. Water is forced from tank 88 through union 112 into filter housing 52. The water continues to be forced downwardly through filter 122 and tube 140 into manifold chamber 34. As explained hereinbefore, the water once again passes through the various nipples 142 into the various incubating tubes 24. As the water flows into tubes 24, it spreads throughout the cross-section of tubes 24 to provide oxygen and cleanse the fish eggs as it flows upwardly in the recirculation path.

During recirculation, the air from air pump 90 continually oxygenates the water. Foam developed by the air lifting the water to tank 88 is captured in foam fractionator cup 110. Particulate matter is removed from the water by filter 122. Water temperature is controlled within a narrow optimal incubating range depending on the type of fish eggs incubated by thermostatic control 154 which controls heat tape 156 wrapped about air lift tube 86.

Incubating apparatus 20 can also be operated in a non-recirculation mode in the event of a breakdown of the recirculation system or in flushing the apparatus following treatment with a fungicide. This is accomplished with the air source turned off and with input valve 78 open to flow sufficient water through incubating tubes 24. Water is discharged through tube 76 without being recirculated.

It is desirable to periodically clean portions of incubating apparatus 20. In particular, it is desirable to remove upper portions 54 of incubating tubes 24 to remove the larger particulate matter such as egg shells and other waste caught in the screens. It is also desirable to periodically replace the filters 122 with clean cartidges. It is also desirable to periodically clean foam fractionator cup 110 and screen 118. After each incubation of fish eggs, the entire apparatus 20 should be thoroughly cleaned.

An alternate embodiment for a number of elements of incubator 20 are shown in FIGS. 11 and 12. Primed numerals indicate similar elements between the alternate embodiment and the embodiment described hereinbefore. A container 22' is shown with insulation 160 used to maintain a reasonably constant temperature therein as indicated hereinbefore. Drainage valve and tube 152 and 150 and overflow tube 76 of the previous embodiment are replaced in the alternate embodiment with standpipe 162. Standpipe 162 is comprised of tubular upper and lower portions 164 and 166. Lower portion 166 fits within an elbow 168 which opens to the exterior of container 22'. It is the most efficient use of space to scallop a portion of insulation 160 in a wall of container 22' adjacent to airlift mechanism 170 for locating standpipe 162 to prevent from decreasing useable incubating space.

The upper portion 164 of standpipe 162 is disconnectable from lower portion 166 and thus replaceable with other lengths. Since it is desirable to periodically drain container 22', it is necessary to remove standpipe 162 from elbow 168 to allow drainage. It is convenient to provide a remote puller 172 attached at one end to lower portion 166 and extending above container 22'.

Airlift mechanism 170 includes a head tube 174 inside a sleeve 176. There must be space for water flow between tube 174 and sleeve 176. A tube 178 for directing pressurized air to bubbler ring 180 near the bottom of tube 174 and sleeve 176 extends upwardly, preferably along the outer surface of airlift tube 176. Tube 174 rises to an elevation somewhat above the desired water level within container 22'. Tube 174 includes an upper screened portion 175. It is convenient for the top end of the screened portion 175 to be formed as a removable screened cup 177. The bottom end of tube 174 is plugged in a fashion similar to the incubator tubes. In this fashion, water may pass through the plug to manifold 34'. The bottom end of air flow tube 176 has scalloped portions 182 for entry of water. Bubbler ring 180 is located in the space between tubes 174 and 176 immediately above scalloped portions 182. As bubbles are emitted from bubbler ring 180, they rise vertically in the space between tube 174 and sleeve 176 thereby creating water flow and in fact lifting water. An appropriate flow of air will lift water a distance above the water level in container 22' to allow it to enter head tube 174 thereby creating a slight pressure head as compared to the remainder of the water in container 22'. The pressure head is sufficient to force water downwardly through head tube 174 into manifold 34' for circulation as hereinbefore described. The upper screened portion 175 of head tube 174 excludes most air bubbles thereby ensuring that water entering head tube 174 is more dense than that with the bubbles. The screening of portion 175 tends to catch fry or eggs accidently spilled from any incubation tubes for removal from the system, or if alive, for replacement in incubation tubes.

A foam fractionator device 184 is installed on top of airlift sleeve 176. Foam fractionator 184 includes an upper tubular portion 186 attached to a somewhat enlarged connector 188 which slips over the top of sleeve 176 thereby allowing tubular portion 186 to rest on sleeve 176 and be retained by connector 188. There is an opening 190 in the wall of tubular portion 186 facing standpipe 162. A wall 192 rises diagonally upwardly from a lower end of opening 190. Wall 192 is attached at three sides but does not reach the wall of tubular portion 186 opposite opening 190. In this fashion, foam from the airlifted water may rise above wall 192 and slide downwardly on wall 192 through opening 190 into standpipe 162.

In FIG. 12, an alternate embodiment of an incubation tube 24' and bottom plug 48' is shown. Incubation tube 24' is preferably a square tube. At its upper end a plurality of screened openings 196 are formed on two abutting sides for a purpose to be explained hereinafter. A screen 198 having a shape similar, but slightly smaller, than tube 24' fits in the upper end of tube 24' so as to cover openings 196. The lower end of screen 198 preferably includes a rubber seal 200. The upper end of screen 198 preferably has a rim 202 extending thereabout to prevent screen 198 from falling into tube 24'. Note that screens 197 are fastened to the external surface of tubes 24' to prevent particulate matter from flowing through openings 196 while screen 198 is removed for cleaning.

Bottom plug 48' includes a coupler 204 having an upper portion 206 slightly smaller than the internal shape of tube 24' to allow tube 24' to slip frictionally thereover. Lower portion 208 of coupler 204 includes a shoulder 210 therewithin against which a perforated plate 212 is retained by bottom sleeve 214. Sleeve 214 fits tightly within lower portion 208. A bottom plate 216 covers the bottom end of sleeve 214 and includes a rubber grommet 218 for fitting about a nipple 42' like in FIG. 10. Perforated plate 212 prevents fish eggs from dropping through the opening in grommet 218 into manifold 34' and also disperses water flow through the eggs and fry.

Incubator tube 24' includes some particularly advantageous features. The purpose of insert screen 198 is to retain egg shells during hatching. Since the fry do not ordinarily rise to the levels of openings 196, screen 198 may be periodically removed and cleaned of the egg shells and other debris. This may be done without removing tube 24' from nipple 42'. When it is desired to remove tube 24' and transfer fry or eggs, the tube may be easily pulled from nipple 42'. The eggs or fry are prevented from falling by perforated plate 212. By forming openings 196 in only two of the four sides of tube 24', the eggs or fry may then be easily poured along the solid sides of tube 24'. The rapid and gentle transfer of fry from an incubation tube 24' by pouring substantially minimizes trauma and thus increases fry survival chances.

The various screens serve a filtering function for particulate matter. Perforated plates 212 disperse water flow and retain egg and fry in the incubation tubes 24'. It is important that plates 212 not become clogged with egg shells or other particulate matter which may circulate with the circulating water. Thus, screens 198 serve as primary filters to retain eggs and fry and collect egg shells and other particulate matter as water flows from tubes 24' into the water bath of container 22'. Screen portion 175 of head tube 174 excludes most air bubbles from entering head tube 174 thereby allowing the air lift to pump water efficiently. Screen portion 175, however, also prevents eggs or fry or egg shells accidently spilled from incubation tubes 24' from circulating further in the system and possibly plugging perforated plates 212. Thus, it is preferable that screens 198 have a mesh size no large than the screen portion 175 of head tube 174.

The foregoing description discusses preferred and other embodiments in detail. Thus, it is understood that the invention may be practiced in a number of fashions. Although numerous characteristics and advantages of the embodiments have been set forth, together with details of structure and function, it is to be understood that changes may be made, especially in matters of shape, size and arrangement. Any changes made to the full extent extended by the general meaning of the terms in which the appended claims are expressed, are to be understood to be within the principle of the invention.

What is claimed is:

1. An apparatus for incubating fish eggs, comprising:
   a plurality of tubes having first and second ends, each said tube for holding a quantity of incubating fish eggs, each said tube including a structure with open sides near the second end of said tube, said structure having a screen attached to all sides thereof, said screen for allowing water to pass therethrough while retaining egg shells and other particulate matter;
   a container for holding at least the first ends of said tubes immersed in water;
   air source means for aerating said water;
   pressure source means for causing said water to flow about a fluid circuit, said pressure source means including a tank for holding water;
   an air lift tube extending between said air source means and said tank, the air from said air source means rising within said air lift tube to lift water to said tank;
   means for filtering said water, said filtering means being located in said fluid circuit between said tank and said plurality of tubes;

manifold means, located in said fluid circuit between said filtering means and said plurality of tubes, for distributing water exiting from said filtering means to all said plurality of tubes; and means for controlling the temperature of said water.

2. An apparatus in accordance with claim 1 wherein said tubes have a substantially square outer perimeter allowing compact arrangement within said container.

3. An apparatus in accordance with claim 1 wherein said container is insulated to maintain the temperature level of said water relatively uniform among said tubes and constant over time.

4. An apparatus in accordance with claim 1 further including water source means for continuously supplying at least some water to said container, said water source means being external to said fluid circuit.

5. An apparatus in accordance with claim 1 wherein said filtering means is comprised of a cylindrical filter element, said filter element having an opening at a first end for fluid communication with said manifold means and a handle at a second end, said filter element being received within one of said tubes, whereby said water flows through said filter element and then out said opening at said first end of said filter element, said handle at said second end being for easy removal of said filter element from said tube.

6. An apparatus in accordance with claim 1 wherein said manifold means includes a chamber member having an input opening and a plurality of output openings, said input opening for receiving water from said filtering means, said output openings for directing water to each of said tubes.

7. An apparatus in accordance with claim 6 wherein said manifold means includes a plurality of nipple elements extending upwardly from said output openings and wherein each of said plurality of tubes includes a plug member in its first end, said plug members having openings therein for mating with said nipple elements.

8. An apparatus in accordance with claim 7 wherein said plug members have an upper surface shaped generally in the form of a concave pyramid and wherein a screen is attached near the low point of the upper surface of each said plug members, said screens for preventing said fish eggs from falling into said chamber member.

9. An apparatus for incubating fish eggs in water, comprising:

a plurality of square tubes having first and second ends, each said tube for holding a quantity of incubating fish eggs, each said tube including a structure with open sides near the second end of said tube, said structure having a screen attached to all sides thereof, said screen for allowing water to pass therethrough while retaining egg shells and other particulate matter;

an insulated container having a rectangular cross-section for compact holding of said tubes, portions of said tubes being immersed in water including said first ends and the portions of said tubes between said first ends and said structures;

means for controlling the temperature of said water; and a fluid circuit, including;

water source means for supplying water to said container, said water source means being external to said fluid circuit;

air source means for aerating said water;

pressure source means for causing said water within said fluid circuit to flow about said fluid circuit, said pressure source means including a tank for holding water;

an airlift tube extending between said air source means and said tank, the air from said air source means rising within said airlift tube to lift water to said tank;

a cylindrical filter element, said filter element having an opening at a first end and a handle at a second end, said filter element being received within one of said tubes, said handle being for easy removal of said filter element from said tube;

means for communicating said aerated water between said tank and said tube holding said filter element; and a chamber member having an input opening for receiving water from said filter element and a plurality of output openings for directing water to each of said tubes, said chamber member including a plurality of nipple elements extending upwardly from said output openings, said nipple elements for mating with the openings in said plug members of said tubes;

whereby said container is filled with water from said water source means, said water thereafter flowing through said fluid circuit, said fluid circuit including said water being aerated by said air source means and lifted by air up said airlift tube to said tank, said water flowing from said tank through said communicating means and filter element downward to said chamber member and from said chamber member through said nipple elements into said plurality of tubes thereby cleansing and aerating said fish eggs and rising to exit through said screens to fluidly communicate again to a point near said air source means.

10. An apparatus in accordance with claim 9 wherein said air source means includes an air diffuser for breaking the air from said air source means into relatively small bubbles.

11. An apparatus in accordance with claim 9 further including means for removing foam which may accumulate in said tank.

12. An apparatus in accordance with claim 9 wherein said fluid circuit further includes means for communicating said water from the lower end of said container near said tube holding said filter element to said air lift tube; and wherein said tube holding said filter element is at least partially cut away to allow said water to exit from said container to said communicating means.

13. An apparatus in accordance with claim 9 further including means for draining said container of said water.

14. An apparatus for incubating fish eggs in water, comprising:

a plurality of means for holding a quantity of fish eggs in water to incubate same;

means for at least partially containing each said holding means within a water bath, the water in each said holding means being in fluid communication with said water bath thereby allowing said water bath to reach a similar first level as the water in each said holding means; and means for circulating oxygenated water through the eggs in each of said holding means, said circulating means including means for lifting water with air from an air source to create a column of oxygenated water having a second level elevationally above the first level of said water bath, said lifting means operating about said column, said lifting means including a sleeve, at least a portion of said column of water being contained within a tube within said sleeve, said tube including an upper screened portion for excluding most air bubbles and filtering particulate matter from said water, whereby the water with fewer bubbles is more dense and proceeds downwardly in said tube, said circulating means further including a manifold chamber for receiving said oxygenated water from said column and distributing same to each of said plurality of holding means;

whereby water in said water bath is drawn to said lifting means for lifting and oxygenating said water for said column, said water proceeding from said column through said manifold chamber to said plurality of holding means for return to said water bath.

15. An apparatus in accordance with claim 14 wherein said tube has a top with a cup resting thereon, said cup having a screened bottom for filtering particulate matter from water passing therethrough.

16. An apparatus in accordance with claim 14 wherein said holding means includes a tube with a removable screen forming an upper portion thereof, said screen for allowing water to pass therethrough while retaining particulate matter, said screen being removable to cleanse of said particulate matter.

17. An apparatus in accordance with claim 14 wherein said holding means includes a square tube having a plurality of openings in two sides thereof near an upper end, said openings for fluid communication of water in said tube with the water bath in said containing means, said two sides free of openings forming a trough for pouring therefrom.

18. An apparatus in accordance with claim 17 wherein said holding means includes a screen for fitting within said tube near said upper end, said screen for covering said openings and for catching particulate matter, said screen being removable to cleanse of said particulate matter.

19. An apparatus in accordance with claim 14 wherein said holding means includes an incubation tube with a plug forming a bottom closure thereof, said plug including an opening for providing fluid communication between said incubation tube and said manifold chamber, said plug including a perforated plate to disperse water flow and retain eggs and fry.

20. An apparatus in accordance with claim 19 wherein said holding means includes a first screen across said opening and wherein said column of water is contained within a second tube having a second screen enclosing an upper portion thereof, said first screen having mesh no large than said second screen, said first screen being a primary filter for particulate matter and said second screen a secondary filter.

21. An apparatus for incubating fish eggs in water, comprising:
a container having insulated sides and bottom, said container holding a water bath;
a manifold chamber for containing oxygenated water and resting on the bottom of said container, said manifold chamber including a plurality of regularly spaced nipples extending thereabove;
a plurality of incubation tubes with bottom plugs having an opening therein, each of said tubes fitting in said container with said plug opening receiving one of said nipples of said manifold chamber, each of said tubes receiving oxygenated water through said nipple and said opening, each of said tubes including means for communicating used water within said tube to the water bath within said container; and
means for lifting water from the water bath with air from an air source to create an oxygenated column of water, said column including means for fitting about one of said nipples to communicate said oxygenated water to said manifold chamber.

22. An apparatus in accordance with claim 21 including a standpipe for maintaining a desired water level for the water bath in said container, said standpipe connecting to means for communicating with space external of said container.

23. An apparatus in accordance with claim 22 wherein said standpipe is located within a grooved portion of one of the walls of said container adjacent to said lifting means, said lifting means including a sleeve having means resting atop said sleeve for separating foam from the lifted water, said separating means including means for directing said foam to said standpipe.

24. An apparatus in accordance with claim 22 wherein said communicating means has an opening with space internal of said container, said opening being no higher than the bottom of said container, whereby removal of said standpipe from said communicating means allows said container to drain.

25. A method of supplying oxygen to fish eggs in a plurality of incubation tubes comprising the steps of:
drawing water from a water bath in fluid communication with water in said incubation tubes;
bubbling air into a first contained column of said drawn water thereby lifting and oxygenating said water;
directing said oxygenated water into a second contained column while simultaneously blocking most bubbles in said water from entering said second contained column, the water in said second contained column for flowing downwardly to a manifold chamber, and
distributing said oxygenated water from said manifold chamber to said plurality of incubation tubes.

26. A method in accordance with claim 25 including mixing and cleansing said eggs by directing said oxygenated water upwardly from said manifold chamber into said incubation tubes.

* * * * *

UNITED STATES PATENT AND TRADEMARK OFFICE
CERTIFICATE OF CORRECTION

PATENT NO. : 4,471,718
DATED : September 18, 1984
INVENTOR(S) : Donald E. Olson

It is certified that error appears in the above-identified patent and that said Letters Patent is hereby corrected as shown below:

Column 1, line 18, "operatable" should be --operable--.

Column 2, line 4, "egss" should be --eggs--.

Column 4, line 62, "deisgnated" should be --designated--.

Column 7, line 19, after "head" insert --in--.

Column 8, line 32, "conductive" should be --conducive--.

Column 9, line 64, "chech" should be --check--.

Column 10, lines 33-34, "cartidges" should be --cartridges--.

Column 12, line 33, "large" should be --larger--.

Column 15, line 58, "large" should be --larger--.

Signed and Sealed this

Twenty-sixth Day of February 1985

[SEAL]

Attest:

DONALD J. QUIGG

Attesting Officer   Acting Commissioner of Patents and Trademarks